United States Patent
Murakami et al.

(10) Patent No.: US 9,865,856 B2
(45) Date of Patent: Jan. 9, 2018

(54) POROUS LAYER, SEPARATOR FORMED BY LAMINATING POROUS LAYER, AND NON-AQUEOUS ELECTROLYTE SECONDARY BATTERY INCLUDING POROUS LAYER OR SEPARATOR

(71) Applicant: Sumitomo Chemical Company, Limited, Tokyo (JP)

(72) Inventors: Chikara Murakami, Osaka (JP);
Kosuke Kurakane, Osaka (JP);
Syusaku Hara, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/781,251

(22) PCT Filed: Jul. 31, 2015

(86) PCT No.: PCT/JP2015/071849
§ 371 (c)(1),
(2) Date: Sep. 29, 2015

(87) PCT Pub. No.: WO2016/031492
PCT Pub. Date: Mar. 3, 2016

(65) Prior Publication Data
US 2017/0162849 A1   Jun. 8, 2017

(30) Foreign Application Priority Data
Aug. 29, 2014   (JP) .................................. 2014-175487

(51) Int. Cl.
*H01M 2/10*   (2006.01)
*H01M 2/16*   (2006.01)
(Continued)

(52) U.S. Cl.
CPC ............. *H01M 2/1686* (2013.01); *B32B 5/32* (2013.01); *B32B 27/32* (2013.01); *H01M 2/166* (2013.01);
(Continued)

(58) Field of Classification Search
CPC ...... H01M 2/16; H01M 2/145; H01M 2/1653; B32B 5/32; B32B 27/32
See application file for complete search history.

(56) References Cited

U.S. PATENT DOCUMENTS

| | | |
|---|---|---|
| 2005/0208383 A1 | 9/2005 | Totsuka et al. |
| 2006/0204855 A1 | 9/2006 | Saruwatari et al. |

(Continued)

FOREIGN PATENT DOCUMENTS

| | | |
|---|---|---|
| CN | 101689624 A | 3/2010 |
| CN | 102150298 A | 8/2011 |

(Continued)

OTHER PUBLICATIONS

Machine Translation of: JP 2014/037136A, Wakahara et al., Feb. 27, 2014.*

(Continued)

*Primary Examiner* — Kenneth J Douyette
(74) *Attorney, Agent, or Firm* — Panitch Schwarze Belisario & Nadel LLP

(57) ABSTRACT

In a porous layer of the present invention, in a case where the porous layer is divided into 32 sections, a degree of variability in voidage that is measured in the 32 sections is 16.0% or lower. Each of the 32 sections is a rectangular parallelepiped whose longitudinal length is 2.3 μm, transverse length is 2.3 μm, and thickness is identical with that of the porous layer. The porous layer of the present invention and a separator formed by laminating the porous layer are (Continued)

suitable as a member for a non-aqueous electrolyte secondary battery that has an excellent cycle characteristic.

13 Claims, 1 Drawing Sheet

(51) Int. Cl.
B32B 5/32 (2006.01)
B32B 27/32 (2006.01)
(52) U.S. Cl.
CPC ....... *H01M 2/1653* (2013.01); *B32B 2457/10* (2013.01)

(56) References Cited

U.S. PATENT DOCUMENTS

| | | |
|---|---|---|
| 2008/0193833 A1 | 8/2008 | Ohashi et al. |
| 2009/0092900 A1 | 4/2009 | Obana et al. |
| 2009/0111025 A1 | 4/2009 | Lee et al. |
| 2010/0173187 A1 | 7/2010 | Nishikawa et al. |
| 2011/0171535 A1 | 7/2011 | Ohinshi et al. |
| 2012/0148901 A1 | 6/2012 | Okamoto |
| 2012/0189815 A1* | 7/2012 | Matsui ................. C08L 23/12 428/156 |
| 2012/0268072 A1 | 10/2012 | Okuno |
| 2013/0095365 A1 | 4/2013 | Nishikawa |
| 2013/0130123 A1 | 5/2013 | Kaneda et al. |
| 2013/0288103 A1 | 10/2013 | Mizuno et al. |
| 2014/0161967 A1 | 6/2014 | Hasegawa et al. |
| 2014/0186715 A1 | 7/2014 | Lee et al. |
| 2014/0255753 A1 | 9/2014 | Ohashi et al. |
| 2014/0329154 A1 | 11/2014 | Shinoda et al. |
| 2014/0361457 A1 | 12/2014 | Nogata |
| 2015/0200388 A1 | 7/2015 | Yoshitomi |
| 2015/0280209 A1 | 10/2015 | Ohara et al. |

FOREIGN PATENT DOCUMENTS

| | | | |
|---|---|---|---|
| CN | 103687675 A | 3/2014 | |
| JP | 2001-316006 A | 11/2001 | |
| JP | 2004098414 A | 4/2004 | |
| JP | 2004300172 A | 10/2004 | |
| JP | 2005268095 A | 9/2005 | |
| JP | 2005302341 A | 10/2005 | |
| JP | 2006019146 A | 1/2006 | |
| JP | 2006253081 A | 9/2006 | |
| JP | 2007234458 A | 9/2007 | |
| JP | 2007273443 A | 10/2007 | |
| JP | 2008-524824 A | 7/2008 | |
| JP | 2008524824 A | 7/2008 | |
| JP | 2008210541 A | 9/2008 | |
| JP | 2008254288 A | 10/2008 | |
| JP | 2009087889 A | 4/2009 | |
| JP | 2009268836 A | 11/2009 | |
| JP | 2010242060 A | 10/2010 | |
| JP | 2011100602 A | 5/2011 | |
| JP | 2011102216 A | 5/2011 | |
| JP | 2011181459 A | 9/2011 | |
| JP | 2012099370 A | 5/2012 | |
| JP | 2012124029 A | 6/2012 | |
| JP | 4988973 B1 | 8/2012 | |
| JP | 2012-199253 A | 10/2012 | |
| JP | 2012199253 A | 10/2012 | |
| JP | 2012227066 A | 11/2012 | |
| JP | 2013142101 A | 7/2013 | |
| JP | 2013218982 A | 10/2013 | |
| JP | 2014037136 A | 2/2014 | |
| JP | 2014099275 A | 5/2014 | |
| JP | 2014128791 A | 7/2014 | |
| TW | 201322533 A | 6/2013 | |
| WO | 2006038532 A1 | 4/2006 | |
| WO | 2011043160 A1 | 4/2011 | |
| WO | 2012020737 A1 | 2/2012 | |
| WO | 2012060147 A1 | 5/2012 | |
| WO | 2013015231 A1 | 1/2013 | |
| WO | 2013146811 A1 | 10/2013 | |
| WO | 2014021292 A1 | 2/2014 | |
| WO | 2014073113 A1 | 5/2014 | |

OTHER PUBLICATIONS

Office Action dated Mar. 29, 2016 in JP Application No. 2015-539903.
International Search Report dated Nov. 2, 2015 in International Application No. PCT/JP2015/071849.
Office Action dated Nov. 4, 2015 in JP Application No. 2015539903.
Office Action dated Jul. 28, 2017 in CN Application No. 201580000457.5.
Office Action dated Mar. 28, 2017 in U.S. Appl. No. 14/781,369 by Murakami.
Office Action dated Oct. 13, 2015 in JP Application No. 2015539904.
International Search Report and Written Opinion dated Oct. 6, 2015 in International Application No. PCT/JP2015/071850.
Office Action dated Jan. 19, 2016 in JP Application No. 2015539904.
"Lithium Ion Secondary Battery," 2nd Edition—Materials and Applications—, Nikkan Kogyo Shimbun, Ltd., p. 111 (2000).
Exhibit No. 5 (An electron micrograph of an active layer indicated in the written argument (Fig. 2) submitted on Jan. 10, 2013 during the examination on Japanese Translation of PCT International Publication Tokuhyo No. 2008-524824).
Office Action dated Feb. 28, 2017 in CN Application No. 201580000457.5.
Office Action dated Jul. 7, 2017 in U.S. Appl. No. 14/781,369, by Murakami.
Exhibit No. 5: Fig. 2 from Written Argument dated Jan. 10, 2013 during the examination of Japanese Patent Application No. 2008-524824 (5 pages).
Written Opposition to Grant of Patent dated Feb. 24, 2017 in JP Patent No. 5976947.
Notification of Reasons for Revocation dated Apr. 21, 2017 in JP Patent No. 5976947.
Office Action dated Jun. 8, 2017 in CN Application No. 201580000462.6.
Office Action dated Oct. 13, 2017 in CN Application No. 201580000462.6.
Office Action dated Nov. 6, 2017 in U.S. Appl. No. 14/781,369, by Murakami.

* cited by examiner

TO NEXT PROCESS

POROUS LAYER, SEPARATOR FORMED BY LAMINATING POROUS LAYER, AND NON-AQUEOUS ELECTROLYTE SECONDARY BATTERY INCLUDING POROUS LAYER OR SEPARATOR

CROSS-REFERENCE TO RELATED APPLICATION

This application is a Section 371 of International Application No. PCT/JP2015/071849, filed Jul. 31, 2015, which has not yet been published, and the disclosure of which is incorporated herein by reference.

TECHNICAL FIELD

The present invention relates to (i) a porous layer which is suitable for a member for a non-aqueous electrolyte secondary battery, (ii) a separator formed by laminating the porous layer, and (iii) a non-aqueous electrolyte secondary battery including the porous layer or the separator.

BACKGROUND ART

A non-aqueous electrolyte secondary battery such as a lithium-ion secondary battery has high energy density. Recently, therefore, the non-aqueous electrolyte secondary battery is widely used as batteries for use in apparatuses such as a personal computer, a mobile phone, and a portable information terminal.

In order to enhance properties (such as safety) of the non-aqueous electrolyte secondary battery, various attempts have been made to improve a separator which is provided between a positive electrode and a negative electrode. In particular, a porous film made of polyolefin is excellent in electrical insulating property and exhibits good ion permeability. Therefore, such a porous film made of polyolefin is widely used as a separator for a non-aqueous electrolyte secondary battery, and various proposals relating to the separator have been made.

For example, Patent Literature 1 proposes a non-aqueous electrolyte battery separator that is a multilayer porous membrane (i) in which a porous layer that contains an inorganic filler or a resin having a melting point and/or a glass transition temperature of 180° C. or higher and has a thickness of 0.2 µm or more and 100 µm or less is provided on at least one surface of a polyolefin resin porous membrane and (ii) which has air permeability of 1 second to 650 seconds/100 cc.

Patent Literature 2 proposes a non-aqueous electrolyte battery separator which is a separator including a polyolefin layer and a heat-resistant insulating layer that (i) is provided on one surface or each of both surfaces of the polyolefin layer, (ii) contains a heat-resistant resin and oxidation-resistant ceramic particles, and (iii) contains the oxidation-resistant ceramic particles at a ratio of 60% to 90%.

CITATION LIST

Patent Literature

[Patent Literature 1]
Japanese Patent Application Publication Tokukai No. 2007-273443 (Publication date: Oct. 18, 2007)
[Patent Literature 2]
Japanese Patent Application Publication Tokukai No. 2009-87889 (Publication date: Apr. 23, 2009)

SUMMARY OF INVENTION

Technical Problem

In order for the non-aqueous electrolyte secondary battery to be repeatedly used, the non-aqueous electrolyte secondary battery is demanded to retain initial discharge capacity even after a charge-discharge cycle of the non-aqueous electrolyte secondary battery is repeated. That is, the non-aqueous electrolyte secondary battery is demanded to have a sufficient cycle characteristic.

However, non-aqueous electrolyte secondary batteries in which the non-aqueous electrolyte battery separators disclosed in Patent Literatures 1 and 2 are used tend to become unable to retain the initial discharge capacity after the charge-discharge cycle is repeated, and therefore the non-aqueous electrolyte secondary batteries cannot be said to have a sufficient cycle characteristic. Under the circumstances, a non-aqueous electrolyte secondary battery having an excellent cycle characteristic is demanded.

The present invention is accomplished in view of the above problems, and its main object is to provide (i) a non-aqueous electrolyte secondary battery which has an excellent cycle characteristic, i.e., can substantially retain an initial discharge capacity even after a charge-discharge cycle is repeated, (ii) a porous layer suitable for use as a member for the non-aqueous electrolyte secondary battery, and (iii) a separator formed by laminating the porous layer.

Solution to Problem

The inventors of the present invention focused on a voidage of a porous layer which is laminated onto one surface or each of both surfaces of a porous film which contains polyolefin as a main component, and have found that, in a case where a degree of variability of the voidage is controlled within a predetermined range, a non-aqueous electrolyte secondary battery, which includes a separator that is a laminated body in which the porous layer is laminated onto one surface or each of both surfaces of the porous film, has an excellent cycle characteristic. Based on this finding, the inventors have accomplished the present invention.

In order to attain the object, in a porous layer of the present invention, in a case where the porous layer is divided into 32 sections, a degree of variability in voidage that is measured in the 32 sections is 16.0% or lower, each of the 32 sections being a rectangular parallelepiped whose longitudinal length is 2.3 µm, transverse length is 2.3 µm, and thickness is identical with that of the porous layer.

In a porous layer of the present invention, in a case where the porous layer is divided into 32 sections, a degree of variability in voidage that is measured in the 32 sections is preferably 7.0% or lower, each of the 32 sections being a rectangular parallelepiped whose longitudinal length is 2.3 µm, transverse length is 2.3 µm, and thickness is identical with that of the porous layer.

The porous layer of the present invention is preferably a resin layer containing a fibrillar resin or a granular resin.

The porous layer of the present invention more preferably contains a filler and a binder resin.

The porous layer of the present invention preferably contains a filler in which, in terms of average particle diameter obtained based on a volume, (i) D10 is 0.005 µm to 0.4 µm, D50 is 0.01 µm to 1.0 µm, and D90 is 0.5 µm to 5.0 µm and (ii) a difference between D10 and D90 is 2 µm or less.

The separator of the present invention is formed by laminating the porous layer on one surface or each of both surfaces of a porous film which contains polyolefin as a main component.

A member of the present invention for a non-aqueous electrolyte secondary battery is made up of a positive electrode, the porous layer, and a negative electrode which are arranged in this order.

A member of the present invention for a non-aqueous electrolyte secondary battery is made up of a positive electrode, the separator, and a negative electrode which are arranged in this order.

A non-aqueous electrolyte secondary battery of the present invention includes the porous layer or the separator.

The present invention includes a porous layer (i) which is laminated on one surface or each of both surfaces of a porous film containing polyolefin as a main component or laminated on a surface of at least one of a positive electrode and a negative electrode, (ii) which is a resin layer containing a fibrillar resin or a granular resin, and (iii) in which, in a case where the porous layer is divided into 32 sections, a degree of variability in voidage that is measured in the 32 sections is 16.0% or lower, each of the 32 sections being a rectangular parallelepiped whose longitudinal length is 2.3 µm, transverse length is 2.3 µm, and thickness is identical with that of the porous layer.

Advantageous Effects of Invention

According to the present invention, it is possible to bring about an effect of providing (i) a non-aqueous electrolyte secondary battery which has an excellent cycle characteristic, i.e., can substantially retain an initial discharge capacity even after a charge-discharge cycle is repeated, (ii) a porous layer suitable for use as a member for the non-aqueous electrolyte secondary battery, and (iii) a separator formed by laminating the porous layer.

DESCRIPTION OF EMBODIMENTS

Figure 1:
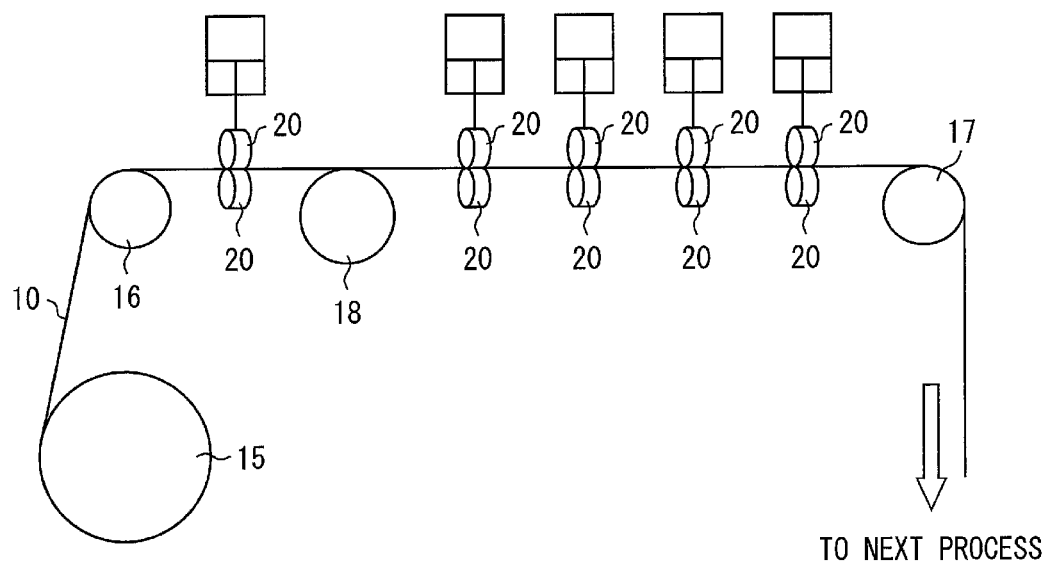
FIG. 1 is a lateral view schematically illustrating a configuration example of a coating device for forming a porous layer of the present invention.

The following description will discuss details of an embodiment of the present invention. Note that, in this application, "A to B" means "A or more (higher) and B or less (lower)".

In the porous layer of the present invention, in a case where the porous layer is divided into 32 sections, a degree of variability in voidage that is measured in the 32 sections is 16.0% or lower, each of the 32 sections being a rectangular parallelepiped whose longitudinal length is 2.3 µm, transverse length is 2.3 µm, and thickness is identical with that of the porous layer.

The porous layer of the present invention can be (i) laminated on one surface or each of both surfaces of a porous film containing polyolefin as a main component or (ii) formed on a surface of at least one of a positive electrode and a negative electrode.

<Porous Film>

The porous film on which the porous layer of the present invention can be laminated (on one surface or each of both surfaces of the porous film) is a base material of a separator. The porous film contains polyolefin as a main component and has a large number of pores which penetrate the porous film so that gas or liquid can pass through the porous film from one side to the other side.

A ratio of polyolefin accounting for the porous film is 50 volume % or higher, more preferably 90 volume % or higher, further preferably 95 volume % or higher, relative to the entire porous film. It is more preferable that the polyolefin contains a polymeric component whose weight-average molecular weight is $5 \times 10^5$ to $15 \times 10^6$. In particular, in a case where the polyolefin contains a polymeric component whose weight-average molecular weight is 1 million or more, strength of the porous film and strength of a laminated body (separator) including the porous film are advantageously improved.

Examples of the polyolefin which is a thermoplastic resin specifically encompass a homopolymer (e.g., polyethylene, polypropylene, polybutene) and a copolymer (e.g., ethylene-propylene copolymer) which are obtained by (co)polymerizing monomers such as ethylene, propylene, 1-butene, 4-methyl-1-pentene, and 1-hexene. Among these, polyethylene is more preferable because it is possible to prevent (shut down) a flow of overcurrent at a lower temperature. Examples of the polyethylene encompass low-density polyethylene, high-density polyethylene, linear polyethylene (ethylene-α-olefin copolymer), ultrahigh molecular weight polyethylene whose weight-average molecular weight is 1 million or more, and the like. Among these, ultrahigh molecular weight polyethylene whose weight-average molecular weight is 1 million or more is further preferable.

A film thickness of the porous film can be determined as appropriate by taking into consideration a film thickness of a laminated body (separator). In a case where the laminated body (separator) is formed by using the porous film as a base material and laminating the porous layer on one surface or each of both surfaces of the porous film, the film thickness of the porous film is preferably 4 µm to 40 µm, more preferably 7 µm to 30 µm.

A weight per unit area of the porous film can be determined as appropriate by taking into consideration strength, a film thickness, a weight, and handleability of a laminated body (separator). The weight per unit area of the porous film is typically preferably 4 $g/m^2$ to 20 $g/m^2$, more preferably 5 $g/m^2$ to 12 $g/m^2$ so that, in a case where the laminated body is used as a separator for a non-aqueous electrolyte secondary battery, higher weight energy density and volume energy density of the battery can be achieved.

Air permeability of the porous film is preferably, as a Gurley value, 30 sec/100 mL to 500 sec/100 mL, more preferably 50 sec/100 mL to 300 sec/100 mL. In a case where the porous film has the above air permeability and a laminated body including the porous film is used as a separator, it is possible to obtain sufficient ion permeability.

A voidage of the porous film is preferably 20 volume % to 80 volume %, more preferably 30 volume % to 75 volume % in order to enhance a retained amount of an electrolyte and to obtain a function to surely prevent (shut down) a flow of overcurrent at a lower temperature. A pore diameter of each of pores in the porous film is preferably 3 µm or less, more preferably 1 µm or less so that, in a case where a laminated body including the porous film is used as a separator, it is possible to obtain sufficient ion permeability and to prevent particles from entering the positive electrode and the negative electrode.

A method for producing the porous film is not limited to a particular one. For example, a method can be employed in which a resin such as polyolefin is formed into a film by adding a plasticizer to the resin, and then the plasticizer is removed by an appropriate solvent.

Specifically, for example, in a case where a porous film is produced by the use of a polyolefin resin which contains ultrahigh molecular weight polyethylene and low molecular weight polyolefin whose weight-average molecular weight is 10 thousand or less, the porous film is preferably produced by a method below, from the viewpoint of production cost.

(1) Step of obtaining a polyolefin resin composition by kneading 100 parts by weight of ultrahigh molecular weight polyethylene, 5 parts by weight to 200 parts by weight of low molecular weight polyolefin whose weight-average molecular weight is 10 thousand or less, and 100 parts by weight to 400 parts by weight of an inorganic filler such as calcium carbonate;
(2) Step of forming a sheet by the use of the polyolefin resin composition;
then,
(3) Step of removing the inorganic filler from the sheet obtained in the step (2);
(4) Step of obtaining a porous film by stretching the sheet from which the inorganic filler has been removed in the step (3), alternatively,
(3') Step of stretching the sheet obtained in the step (2);
(4') Step of obtaining a porous film by removing the inorganic filler from the sheet which has been stretched in the step (3').

Note that the porous film can be a commercially available one which has the above described physical properties.

The porous film is more preferably subjected to hydrophilizing treatment before a porous layer is formed, i.e., before a coating liquid (later described) is applied. In a case where the porous film is subjected to the hydrophilizing treatment, coatability of the coating liquid is further improved, and it is therefore possible to form a further uniform porous layer. The hydrophilizing treatment is effective for a case where a high ratio of water accounts for a solvent (dispersion medium) which is contained in the coating liquid. Specifically, examples of the hydrophilizing treatment encompass known treatments such as chemical treatment by acid or alkali, etc., corona treatment, and plasma treatment. Among the above hydrophilizing treatments, the corona treatment is more preferable because the porous film can be hydrophilized in a relatively short time and only the vicinity of a surface of the porous film is hydrophilized, i.e., inside quality of the porous film is not changed.

According to need, the porous film can include another porous layer which is different from the porous layer of the present invention. Such another porous layer can be a known porous layer such as a heat-resistant layer, an adhesive layer, or a protective layer. A concrete example of the another porous layer encompasses a porous layer which has a composition identical with that of the porous layer of the present invention (later described).

<Porous Layer>

The porous layer of the present invention is typically a resin layer containing a resin. The porous layer of the present invention is laminated on one surface or each of both surfaces of the porous film or is laminated on a surface of at least one of the positive electrode and the negative electrode.

The porous layer is preferably a heat-resistant layer or an adhesive layer that is laminated on one surface or each of both surfaces of the porous film. The resin constituting the porous layer is preferably insoluble in a battery electrolyte and is electrochemically stable within a used range of the battery. In a case where the porous layer is laminated on one surface of the porous film, the porous layer is preferably laminated on a surface of the porous film which surface faces the positive electrode in the non-aqueous electrolyte secondary battery, and is more preferably laminated so as to make contact with the positive electrode.

The porous layer of the present invention can serve, alone, as a separator that can be used in a non-aqueous electrolyte secondary battery. Alternatively, the porous layer of the present invention can be a porous layer for a separator that can be used in a non-aqueous electrolyte secondary battery, that is, the porous layer of the present invention can be a porous layer that constitutes the separator.

The porous layer of the present invention can be a resin layer containing a fibrillar resin or a granular resin.

Concrete examples of the resin encompass: polyolefins such as polyethylene, polypropylene, polybutene, and ethylene-propylene copolymers; fluorine-containing resins such as polyvinylidene fluoride (PVDF) and polytetrafluoroethylene; fluorine-containing rubbers such as vinylidene fluoride-hexafluoropropylene-tetrafluoroethylene copolymers and ethylene-tetrafluoroethylene copolymers; aromatic polyamides; wholly aromatic polyamides (aramid resins); rubbers such as styrene-butadiene copolymers and hydrides thereof, methacrylic acid ester copolymers, acrylonitrile-acrylic acid ester copolymers, styrene-acrylic acid ester copolymers, ethylene propylene rubber, and polyvinyl acetate; resins whose melting point or glass transition temperature is 180° C. or higher, such as polyphenylene ether, polysulfone, polyether sulfone, polyphenylene sulfide, polyetherimide, polyamide imide, polyetheramide, and polyester; water-soluble polymers such as polyvinyl alcohol, polyethylene glycol, cellulose ether, sodium alginate, polyacrylic acid, polyacrylamide, and polymethacrylic acid; and the like.

Further, concrete examples of the aromatic polyamide encompass: poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, a metaphenylene terephthalamide/2,6-dichloroparaphenylene terephthalamide copolymer, and the like. The aromatic polyamide is more preferably poly(paraphenylene terephthalamide) among the above examples.

The resin is more preferably any of the polyolefins, the fluorine-containing resins, the aromatic polyamides, and the water-soluble polymers among the above examples of the resin. Further, the resin is more preferably any of the water-soluble polymers in view of processes and environmental load, because in the case of the water-soluble polymers, water can be used as a solvent for forming a porous layer. The water-soluble polymer is further preferably polyvinyl alcohol, cellulose ether, or sodium alginate, and particularly preferably cellulose ether.

Concrete examples of the cellulose ether encompass: carboxymethyl cellulose (CMC), hydroxyethyl cellulose (HEC), carboxyethyl cellulose, methyl cellulose, ethyl cellulose, cyanoethyl cellulose, oxyethyl cellulose, and the like. The cellulose ether is more preferably CMC or HEC and particularly preferably CMC, because CMC and HEC less degrade in use over a long term and are excellent in chemical stability.

The resin can be a binder resin. The binder resin is particularly preferably any of the fluorine-containing resins, the aromatic polyamides, and the water-soluble polymers.

The resin used for the resin layer containing fibrillar or granular resin is particularly preferably any of the polyolefins, the fluorine-containing resins, and the aromatic polyamides, and more preferably any of the fluorine-containing resins.

The porous layer more preferably contains a filler. In a case where the porous layer contains the filler, the resin functions as a binder resin.

Examples of the filler that can be contained in the porous layer according to the present invention encompass a filler made of an organic matter and a filler made of an inorganic matter. Concrete examples of the filler made of an organic matter encompass fillers made of (i) homopolymers of monomers such as styrene, vinyl ketone, acrylonitrile, methyl methacrylate, ethyl methacrylate, glycidyl methacrylate, glycidyl acrylate, or methyl acrylate or (ii) copolymers of two or more kinds of monomers such as styrene, vinyl ketone, acrylonitrile, methyl methacrylate, ethyl methacrylate, glycidyl methacrylate, glycidyl acrylate, and methyl acrylate; fluorine-containing resins such as polytetrafluoroethylene, tetrafluoroethylene hexafluoropropylene copolymers, ethylene-tetrafluoroethylene copolymers, and polyvinylidene fluoride; melamine resin; urea resin; polyethylene; polypropylene; polyacrylic acid, polymethacrylic acid; and the like. Concrete examples of the filler made of an inorganic matter encompass fillers made of an inorganic matter such as calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, glass, and the like. The fillers can be used alone or in combination of two or more kinds.

The fillers made of an organic matter, which are generally called a filling material, are suitable as the filler. The filler is more preferably a filler made of inorganic oxide such as silica, calcium oxide, magnesium oxide, titanium oxide, alumina, mica, or zeolite, further preferably at least one kind of filler selected from among a group consisting of silica, magnesium oxide, titanium oxide, and alumina, and particularly preferably alumina. There are various crystal forms of alumina, such as α-alumina, β-alumina, γ-alumina, θ-alumina, etc. It is possible to suitably use alumina of any form. Among the various forms of alumina, α-alumina is the most preferable because α-alumina has a particularly high thermal stability and a particularly high chemical stability.

A shape of the filler varies depending on a method for producing a raw material, i.e., an organic substance or an inorganic substance, a dispersion condition of the filler when a coating liquid for forming the porous layer is prepared, and the like. The shape of the filler is not limited to a particular one and can be any of various shapes including (i) a shape such as a spherical shape, an oval shape, a rectangular shape, a gourd-like shape and (ii) an indefinite shape having no specific shape, provided that the filler has a particle diameter described below.

The filler made of an inorganic oxide can be wet-ground with the use of a wet grinding device in order to control an average particle diameter. That is, it is possible to obtain a filler having an intended average particle diameter by putting a coarse filler and an appropriate solvent into the wet grinding device and wet grinding the coarse filler. The solvent is not limited to a particular one and is preferably water from the viewpoint of process and environmental loads. Alternatively, by taking into consideration coatability of the coating liquid (described later), it is possible to mix water with lower alcohol such as methyl alcohol, ethyl alcohol, n-propyl alcohol, isopropyl alcohol, or t-butyl alcohol; or an organic solvent such as acetone, toluene, xylene, hexane, N-methylpyrrolidone, N,N-dimethylacetamide, or N,N-dimethylformamide.

The wet grinding device is roughly classified into a stirring type and a medium type such as a ball mill and a bead mill (Dinomill), and an optimal grinding device can be employed in accordance with a type of the filler. In a case where a filler which is made of an inorganic oxide having high hardness is used, it is optimal to use the bead mill (Dinomill) that has a high grinding capability. Grinding force of the bead mill is greatly influenced by factors such as a bead material, a bead diameter, a bead filling factor (relative to vessel volume of Dinomill), a flow rate, and a circumferential speed. Therefore, in order to obtain a filler having an intended average particle diameter, a slurry of a filler obtained by wet grinding can be extracted in accordance with an intended residence time, by taking into consideration the above factors. A filler content in the slurry obtained by wet grinding is preferably 6% by weight to 50% by weight, more preferably 10% by weight to 40% by weight.

Note that the residence time can be calculated by formulae below, in a pass system and a circulation system:

Residence time (pass system) (min.)=[Vessel volume (L)−bead filling volume (L)+bead void volume (L)]/flow rate (L/min.)

Residence time (circulation system) (min.)=[{Vessel volume (L)−bead filling volume (L)+bead void volume (L)}/slurry amount (L)]×circulation time (min.)

With regard to an average particle diameter based on a volume and particle size distribution based on a volume of the filler, D10 is preferably 0.005 μm to 0.4 μm, more preferably 0.01 μm to 0.35 μm; D50 is preferably 0.01 μm to 1.0 μm, more preferably 0.1 μm to 0.8 μm; and D90 is preferably 0.5 μm to 5.0 μm, more preferably 0.8 μm to 2.5 μm. Moreover, a difference between D10 and D90 is preferably 2.5 μm or less, more preferably 2 μm or less, further preferably 1.5 μm or less, particularly preferably 1 μm or less. In a case where a filler having such average particle diameter and particle size distribution is used, a degree of variability in voidage of the porous layer tends to become small. Although depending on an added amount of the filler, the filler having the average particle diameter and the particle size distribution within the above range constitutes a structure which is moderately shifted from a closest packed structure. This allows an increase in voidage of the porous layer, and it is therefore possible to reduce a weight per unit area while retaining a moderate ion permeability (air permeability). From this, it is consequently possible to form a laminated body that is excellent in ion permeability, has a light weight, and is suitable as a separator for a non-aqueous electrolyte secondary battery. In a case where a filler is used whose average particle diameter and particle size distribution exceed the above range, the filler is more likely to precipitate when a coating liquid for forming a porous layer is prepared. Moreover, the filler tends to constitute a structure that is close to a closest packed structure, and therefore a voidage of the porous layer is decreased. Consequently, an ion permeability is to be decreased, and a weight per unit area is to be increased. On the other hand, in a case where a filler is used whose average particle diameter and particle size distribution are less than the above range, cohesive force between particles in the filler becomes excessively high, and therefore dispersibility tends to be decreased.

It is possible to use two or more fillers which are different from each other in particle diameter and specific surface area. An average particle diameter of the filler can be calculated by, for example, (i) a method in which 25 particles are arbitrarily selected by a scanning electron microscope (SEM), particle diameters (diameter) of the particles are measured, and an average of the 25 particle diameters is calculated or (ii) a method in which a BET specific surface area is measured, and an average particle diameter is calculated by spherical approximation based on the BET specific surface area. Note that, in a case where the average particle diameter is calculated by the use of the SEM and a shape of particles of the filler is not a spherical shape, a greatest length of each of the particles of the filler is assumed to be a particle diameter.

The specific surface area of the filler can be measured by a method utilizing moisture vapor adsorption or by a method utilizing nitrogen adsorption. A concrete measuring method will be described later. By carrying out at least any of the above methods, the specific surface area of the filler can be measured.

In a case where the porous layer contains a filler, a filler content is preferably 1 volume % to 99 volume %, more preferably 5 volume % to 95 volume %, relative to the porous layer. In a case where the filler content is within the above range, gaps formed by contacts of particles of the filler are less likely to be blocked by a resin and the like, and it is therefore possible to obtain a sufficient ion permeability and an appropriate weight per unit area.

The porous layer containing a filler and a binder resin is preferably a porous layer in which the filler is bound by the binder resin. That is, a porous layer in which a filler is dispersed in a resin (binder resin) is not suitable as the porous layer containing a filler and a binder resin. In the porous layer containing the filler and the binder resin, a filler content is preferably 60 mass % or higher, more preferably 70 mass % or higher, further preferably 80 mass % or higher, most preferably 90 mass % or higher, and preferably 99 mass % or lower, relative to a total mass of the porous layer.

In the present invention, typically, a coating liquid for forming the porous layer is prepared by dissolving the resin in a solvent and, if needed, dispersing the filler. Here, the resin can be dispersed in the solvent. By using, as the coating liquid, (i) an emulsion in which the resin is dispersed in a solvent or (ii) a suspension in which the resin is dispersed in a solvent, it is possible to form a resin layer that contains the granular resin.

The solvent (dispersion medium) is not limited to a particular one, provided that the solvent (i) does not adversely influence a subject (e.g., a porous film, a positive electrode, a negative electrode, or the like) to which the coating liquid is applied, (ii) dissolves the resin uniformly and stably, and (iii) disperses the filler uniformly and stably. Concrete examples of the solvent (dispersion medium) encompass water; lower alcohol such as methyl alcohol, ethyl alchol, n-propyl alcohol, isopropyl alcohol, and t-butyl alcohol; acetone, toluene, xylene, hexane, N-methylpyrrolidone, N,N-dimethylacetamide, and N,N-dimethylformamide. The solvent (dispersion medium) can be used alone or in combination of two or more of these.

The coating liquid can be prepared by any method, provided that conditions (such as a resin solid content (resin concentration) and a filler amount) necessary for obtaining an intended porous layer are satisfied. Concrete examples of the method for preparing the coating liquid encompass a mechanical stirring method, an ultrasonic dispersion method, a high-pressure dispersion method, a medium dispersion method, and the like. The filler can be dispersed in the solvent (dispersion medium) by the use of a conventionally known dispersing device such as a three-one motor, a homogenizer, a medium type dispersing device, or a pressure type dispersing device. Further, a liquid in which the resin is dissolved or swollen or an emulsified liquid of the resin can be supplied to a wet grinding device when a filler is wet ground in order to obtain a filler having an intended average particle diameter, and it is thus possible to prepare a coating liquid concurrently with the wet grinding of the filler. That is, the wet grinding of the filler and the preparation of the coating liquid can be carried out in a single process. The coating liquid can contain, as a component other than the resin and the filler, a dispersing agent and/or an additive such as a plasticizer, a surfactant, or a pH adjuster, as long as the purpose of the present invention is not impaired. Note that an added amount of the additive can be determined within a range that does not impair the purpose of the present invention.

A method for applying the coating liquid to the porous film, the positive electrode, or the negative electrode is not limited to a particular one. That is, a method for forming a porous layer (i) on a surface of the porous film which has been subjected to hydrophilizing treatment according to need or (ii) on a surface of at least one of the positive electrode and the negative electrode is not limited to a particular one. In a case where the porous layers are laminated on both surfaces of the porous film, it is possible to employ (i) a sequential laminating method in which a porous layer is formed on one surface of the porous film and then another porous layer is formed on the other one surface of the porous film or (ii) a simultaneous laminating method in which porous layers are simultaneously formed on both surfaces of the porous film. Examples of the method for forming the porous layer encompass a method in which a coating liquid is applied directly on a surface of a porous film and then a solvent (dispersion medium) is removed; a method in which a coating liquid is applied to an appropriate support, a solvent (dispersion medium) is removed so as to form a porous layer, and then the porous layer and a porous film are bonded together by pressure, and then the support is peeled off; a method in which a coating liquid is applied to an appropriate support, then a porous film is bonded to the coated surface by pressure, then the support is peeled off, and then the solvent (dispersion medium) is removed; a method in which a porous film is soaked in a coating liquid so as to carry out dip coating, and then a solvent (dispersion medium) is removed; and the like. A thickness of the porous layer can be controlled by adjusting a thickness of a coating film which is in a wet state (Wet) after coating, a weight ratio of the resin and the filler, a solid content concentration (i.e., a sum of a resin concentration and a filler concentration) of the coating liquid, and the like. Note that the support can be, for example, a resin film, a metal belt, a drum, or the like.

The method for applying the coating liquid to the porous film, the positive electrode, the negative electrode, or the support is not limited to a particular one, provided that the method can achieve a necessary weight per unit area and a necessary coating area. The method for coating with the coating liquid can be a conventionally known method. Concrete examples of the coating method encompass a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, a spray coating method, and the like.

In the present invention, it is more preferable to employ a coating device which includes a wrinkle-stretching mechanism so that the coating liquid can be more uniformly applied to, for example, a surface of the base material (porous film) or a surface of at least one of the positive electrode and the negative electrode. Specifically, the wrinkle-stretching mechanism is more preferably a bent roll (e.g., bow-like roll, banana-like roll, curved roll), a flat expander roll, a helical roll, or a pinch expander.

In a case where a coating liquid having high viscosity is applied, the bar coater method or the die coater method is preferably employed. In a case where a coating liquid having low viscosity is applied, the gravure coater method is preferably employed. In a case where the gravure coater method is employed, it is particularly preferable to use a coating device which includes a pinch expander as the wrinkle-stretching mechanism.

By applying the coating liquid while a wrinkle of the base material is stretched by the wrinkle-stretching mechanism, it is possible to effectively inhibit unevenness and a wrinkle caused in the porous layer. That is, uneven coating with the coating liquid is prevented, and it is therefore possible to uniformly apply the coating liquid. From this, a degree of variability in voidage of the porous layer tends to become small.

Figure 2:
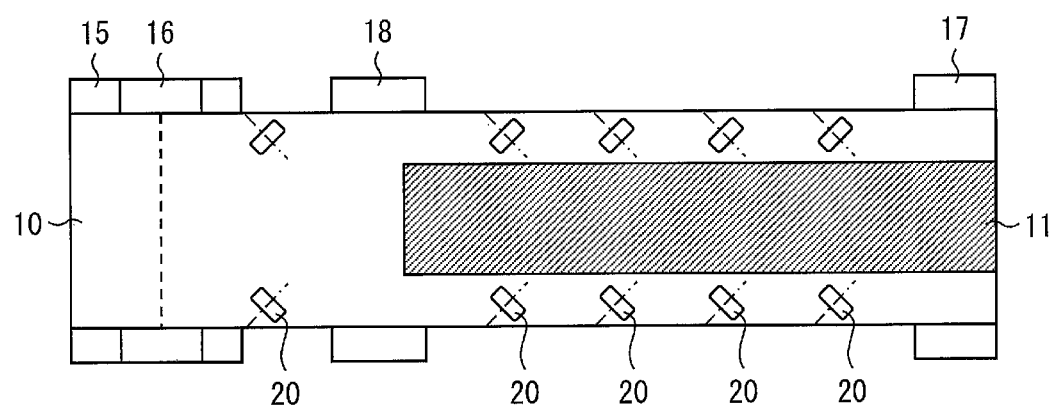
FIG. 2 is a plan view schematically illustrating the coating device.

The coating device is not limited to a particular one. The coating device including the wrinkle-stretching mechanism can be, for example, a coating device disclosed in Japanese Patent Application Publication Tokukai No. 2001-316006 or a coating device disclosed in Japanese Patent Application Publication Tokukai No. 2002-60102. An example configuration of a coating device for forming the porous layer of the present invention is illustrated in FIG. 1 and FIG. 2 (i.e., schematic lateral view and a schematic plan view, respectively).

The coating device in accordance with the present embodiment includes a wind-off device 15. A base material 10 which has been wound off from the wind-off device 15 is conveyed to a gravure roll 18 via a guide roll 16. Then, a coating liquid 11 for forming a porous layer is applied to one surface of the base material 10 by the gravure roll 18. Then, the base material 10 which has been coated with the coating liquid 11 is sent to a next process via a guide roll 17.

Plural pairs of pressing rollers 20 (pinch expander) are provided between the guide roll 16 and the gravure roll 18 and between the gravure roll 18 and the guide roll 17 so as to sandwich and hold both lateral edge parts of the base material 10. By the pressing rollers 20, tension is applied to the base material 10 toward outer sides in a width direction, and it is thus possible to prevent a longitudinal wrinkle from being formed in the base material 10.

Note that it is possible to provide a dryer for drying the coating liquid 11 between the gravure roll 18 and the guide roll 17, and it is also possible to provide a dryer for drying the coating liquid 11 on a downstream side of the guide roll 17. Alternatively, it is possible to provide a dryer which further includes pressing rollers, or it is possible to provide a dryer which does not include pressing rollers. Note that a concrete example of the dryer will be described later.

As illustrated in FIG. 2, the pairs of pressing rollers 20 provided on both sides of the base material 10 in the width direction are arranged such that a shaft center of each of the pressing rollers 20 is oblique with respect to a conveying direction of the base material 10 so that the shaft centers are inclined along (so as to follow) the conveying direction of the base material 10. Note that an oblique angle can be adjusted to an intended angle. According to the configuration, it is possible to more effectively prevent a longitudinal wrinkle from being formed in the base material 10.

The pairs of pressing rollers 20 which are provided on both sides of the base material 10 in the width direction are configured such that, when the pairs of pressing rollers 20 sandwich and hold the both lateral edge parts of the base material 10, a total of contact lengths Da and Db of contact between the base material 10 and the pressing rollers 20 in the width direction of the base material 10 becomes 25% or lower, more preferably 15% or lower, further preferably 10% or lower, relative to a width D of the base material 10. According to the configuration, it is possible to reduce damage to the base material 10 caused by the pressing rollers 20.

In view of prevention of deformation and breakage of the base material 10, it is preferable that a peripheral surface of each of the pressing rollers 20 is a flat surface or a curved surface so that stress will not be locally concentrated on the base material 10. In this case, the pressing rollers 20 which are paired so as to sandwich the base material 10 in a thickness direction can have peripheral surfaces of identical shapes. Alternatively, each pair of the pressing rollers 20 sandwiching the base material 10 in the thickness direction can be configured such that a peripheral surface of one of the pressing rollers 20 is a flat surface and a peripheral surface of the other one of the pressing rollers 20 is a curved surface.

It is possible to provide a rubber ring on the peripheral surface of each of the pressing rollers 20. According to the configuration, a dynamical friction coefficient between the base material 10 and the pressing rollers 20 becomes large, and it is therefore possible to reduce a width of each of the pressing rollers 20 (in other words, it is possible to shorten a total of the contact lengths Da and Db). Consequently, it is possible (i) to reduce loss portions in the both lateral edge parts of the base material 10 which loss portions cannot be used as a product and (ii) to prevent deformation and breakage of the base material 10 which are caused when the pressing rollers 20 make contact with the base material 10.

The solvent (dispersion medium) is generally removed by a drying method. The drying method can be air drying, air blow drying, drying by heating, drying under reduced pressure, or the like. The drying method can be any of methods, provided that the solvent (dispersion medium) can be sufficiently removed. Alternatively, it is possible to carry out drying after the solvent (dispersion medium) contained in the coating liquid is substituted by another solvent. The method in which the solvent (dispersion medium) is removed after being substituted by another solvent can be a method in which, for example, with the use of another solvent (hereinafter, referred to as "solvent X") which is to be dissolved in the solvent (dispersion medium) contained in the coating liquid and does not dissolve the resin contained in the coating liquid, the porous film or the support which has been coated with the coating liquid is soaked in the solvent X, the solvent (dispersion medium) in the coating film on the porous film or the support is substituted by the solvent X, and then the solvent X is evaporated. According to such a method, it is possible to form a resin layer which contains a fibrillar resin. Moreover, according to such a method, it is possible to efficiently remove the solvent (dispersion medium) from the coating liquid. Note that, in a case where the solvent (dispersion medium) or the solvent X is removed, by heating, from the coating film of the coating liquid formed on the porous film or the support, the heating is preferably carried out at a temperature at which an air permeability of the porous film will not be decreased, specifically, at 10° C. to 120° C., more preferably 20° C. to 80° C., in order to avoid a decrease in air permeability caused by shrinkage of pores in the porous film.

In the present embodiment, in particular, it is preferable to remove the solvent (dispersion medium) by the method in which a coating liquid is applied to a base material and then the coating liquid is dried so as to form a porous layer. According to the configuration, it is possible to provide the porous layer in which a degree of variability in voidage is small and which hardly has a wrinkle.

The drying can be carried out with the use of a general dryer.

A film thickness of the porous layer of the present invention formed by the above described method can be determined as appropriate by taking into consideration a film thickness of the laminated body (separator). In a case where the laminated body (separator) is formed by using a porous film as a base material and laminating the porous layer on one surface or each of both surfaces of the porous film, the film thickness of the porous layer is preferably 0.1 µm to 20 µm (in a case where the porous layers are formed on both surfaces, a total of film thicknesses is preferably within this range), more preferably 2 µm to 15 µm. In a case where the film thickness of the porous layer exceeds the above range and the laminated body is used as a separator, a load characteristic of the non-aqueous electrolyte secondary battery may be deteriorated. In a case where the film thickness of the porous layer is smaller than the above range and the battery generates heat by an accident or the like, the porous layer may be broken due to thermal shrinkage of the porous film and the separator may consequently shrink.

In the descriptions below relating to physical properties of the porous layer, in a case where the porous layers are laminated on both surfaces of the porous film, physical properties will be described as to at least the porous layer that is laminated on a surface of the porous film which surface faces the positive electrode in the non-aqueous electrolyte secondary battery.

A weight per unit area of the porous layer can be determined as appropriate by taking into consideration strength, a film thickness, a weight, and handleability of the laminated body (separator). Typically, the weight per unit area of the porous layer is preferably 1 g/m$^2$ to 20 g/m$^2$, more preferably 4 g/m$^2$ to 10 g/m$^2$ so as to heighten weight energy density and volume energy density in the non-aqueous electrolyte secondary battery in which the laminated body is used as the separator. In a case where the weight per unit area of the porous layer exceeds the above range and the laminated body is used as the separator, the non-aqueous electrolyte secondary battery becomes heavy.

A voidage of the porous layer is preferably 10 volume % to 90 volume %, more preferably 30 volume % to 70 volume % so as to obtain a sufficient ion permeability. A pore diameter of pores in the porous layer is preferably 3 µm or less, more preferably 1 µm or less so as to obtain a sufficient ion permeability when the laminated body is used as the separator.

A "degree of variability in voidage" of the porous layer of the present invention is a numerical value that is measured by the following method.

First, the porous layer of the laminated body (separator) is impregnated with an epoxy resin so as to fill voids in the porous layer, then the epoxy resin is hardened, and thus a sample is prepared. After the hardening, a surface of the porous layer is subjected to FIB treatment in a depth direction (toward inside the sample) with the use of FIB-SEM (manufactured by FEI; HELIOS600), and thus a treated surface is prepared. In this case, the FIB treatment is carried out until a porous structure is observed in all upper surfaces (nearer to the surface of the porous layer) of rectangular parallelepipeds which are respective 32 sections obtained by dividing the porous layer as described below. That is, the treated surface is a surface (i) on which the porous structure is observed in all the 32 sections and (ii) whose depth is nearer to a surface of the porous layer as much as possible (in other words, the upper surface of the rectangular parallelepiped which is each of the 32 sections described below). The treated surface thus obtained is subjected to SEM observation (reflection electron image) at an acceleration voltage of 2.1 kV. After the SEM observation, the sample is subjected to FIB treatment at a thickness of 20 nm in the depth direction (i.e., the thickness (film thickness) direction of the porous layer) and thus a new treated surface is prepared. The new treated surface is subjected to SEM observation (reflection electron image). Similarly, the sample is subjected to FIB treatment at a thickness of 20 nm from the new treated surface and thus another new treated surface is prepared. The another new treated surface is subjected to SEM observation (reflection electron image). By thus repeatedly carrying out FIB treatment at thickness intervals of 20 nm and SEM observation on treated surfaces, sequential slice images are obtained entirely across the porous layer in the thickness direction. Then, positional correction is carried out with the use of image analyzing software (manufactured by Visualization Sciences Group; Avizo ver. 6.0) and thus corrected sequential slice images are obtained. Scales are as follows: 19.2 nm/pix in X and Y axes, and 20 nm/pix in Z axis.

The sequential slice images thus obtained are divided into 32 sections each of which is a rectangular parallelepiped whose longitudinal length is 2.3 µm, transverse length is 2.3 11m, and thickness is identical with that of the porous layer. The 32 sections are trimmed, and a voidage of the porous layer in each of the 32 sections is measured by three dimensional quantitative analysis. The three dimensional quantitative analysis is carried out by the use of quantitative analysis software TRI/3D-BON (manufactured by Ratoc System Engineering Co., Ltd.)

Specifically, on the above software, the images are converted into 2-level gradation images by Auto-LW so as to distinguish a resin part and voids included in the porous layer in each of the 32 sections. In a case where an aggregate of fine particles of the filler and the like in the resin part exhibits a halftone contrast, a process is carried out in which only a part of the halftone contrast is extracted by a function of arithmetic calculation that is carried out based on an image and the extracted part is superimposed on the resin part. By this process, it is possible to convert the images into 2-level gradation images in which the aggregate of fine particles is also dealt with as the resin part. The voidage is calculated by dividing a volume of voids, which have been measured by these processes, by a total volume (i.e., a volume of the resin part and the voids) of the analyzed area.

The above observation and analysis are carried out on 32 sections of one (1) sample, and thus a voidage in each of the sections is calculated. Then, a standard deviation of voidages obtained in the 32 sections is divided by an average of the voidages, and thus a degree of variability in voidage in the 32 sections of the porous layer is calculated. A smaller degree of variability of the porous layer indicates that voids are formed more uniformly in the entire surface. In the porous layer of the present invention, the degree of variability in voidage between the 32 sections is 16.0% or lower, preferably 7.0% or lower, more preferably 4.0% or lower. Moreover, the degree of variability in voidage is preferably 0.01% or higher, more preferably 0.5% or higher.

In a case where the degree of variability in voidage is 16.0% or lower, i.e., the voidage is substantially uniform and the laminated body is used as the separator, lithium ions can substantially uniformly pass through the entire separator. Therefore, electric current density of lithium ions becomes substantially uniform across the entire separator. From this, it is possible to obtain uniform density (electric current density) of lithium ions which pass through toward the positive electrode in the non-aqueous electrolyte secondary battery, and it is possible to inhibit nonuniform (local) expansion and shrinkage of a positive-electrode active substance. It is therefore possible to inhibit local deterioration of the positive electrode and to improve a cycle characteristic. In a case where the degree of variability in voidage exceeds 16.0%, the electric current density of lithium ions across the entire separator becomes significantly nonuniform, and this leads to local deterioration of the positive electrode. That is, the voids are not formed uniformly across the entire separator, and therefore the density (electric current density) of passing lithium ions becomes nonuniform, and consequently a load applied to the electrolyte becomes nonuniform. Therefore, in a case where the cycle is repeated, the positive electrode is deteriorated and the cycle characteristic is decreased. On the other hand, in a case where the degree of variability in voidage is less than 0.01%, a large number of through holes exist in the thickness direction of the separator, and this is more likely to cause heat generation due to short-circuit between the positive electrode and the negative electrode when metal Li, etc. is separated in the surface of the electrode or when an active material is separated from an electrode composite layer.

<Separator>

The separator of the present invention is formed by laminating the porous layer on one surface or each of both surfaces of the porous film by the above described method. That is, the separator of the present invention is configured by laminating the porous layer on one surface or each of both surfaces of the porous film.

The air permeability of the separator (in Gurley value) is preferably 30 sec/100 mL to 1000 sec/100 mL, more preferably sec/100 mL to 800 sec/100 mL. In a case where the separator has the above air permeability and the separator is used as a member for a non-aqueous electrolyte secondary battery, it is possible to obtain a sufficient ion permeability. In a case where the air permeability exceeds the above range, such a case means that the voidage of the separator is high and therefore the separator has a rough lamination structure. As a result, strength of the separator is decreased, and shape stability may become insufficient particularly at a high temperature. On the other hand, in a case where the air permeability is less than the above range and the separator is used as a member of a non-aqueous electrolyte secondary battery, a sufficient ion permeability cannot be obtained and a battery characteristic of the non-aqueous electrolyte secondary battery may be decreased.

Note that the separator of the present invention can include, in addition to the porous film and the porous layer, a known porous membrane such as a heat-resistant layer, an adhesive layer, or a protective layer according to need, within a range that does not impair the purpose of the present invention.

<Non-Aqueous Electrolyte Secondary Battery>

The non-aqueous electrolyte secondary battery of the present invention includes the porous layer or the separator. Specifically, the non-aqueous electrolyte secondary battery of the present invention includes a member for a non-aqueous electrolyte secondary battery in which member a positive electrode, the porous layer or the separator, and a negative electrode are arranged in this order. Note that the member for the non-aqueous electrolyte secondary battery in which member a positive electrode, the porous layer, and a negative electrode are arranged in this order may further include, between the positive electrode and the negative electrode, (i) a porous film whose main component is polyolefin or (ii) both the porous layer and another porous layer. The following description will discuss a lithium-ion secondary battery as an example of the non-aqueous electrolyte secondary battery. Note that constituent elements in the non-aqueous electrolyte secondary battery other than the porous layer and the separator are not limited to the constituent elements described below.

In the non-aqueous electrolyte secondary battery according to the present invention, it is possible to use, for example, a non-aqueous electrolyte obtained by dissolving lithium salt into an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$ and the like. The above examples of the lithium salt can be used alone or in combination of two or more kinds. The lithium salt is more preferably at least one kind of fluorine-containing lithium salt selected from among a group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ among the above examples of the lithium salt.

Concrete examples of the organic solvent which is a component of the non-aqueous electrolyte encompass: carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and y-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone; fluorine-containing organic solvents obtained by introducing a fluorine group into the organic solvent; and the like. The above examples of the organic solvent can be used alone or in combination of two or more kinds. Among the above examples of the organic solvent, the organic solvent is more preferably any of the carbonates, and further preferably a mixed solvent of a cyclic carbonate and a non-cyclic carbonate, or a mixed solvent of a cyclic carbonate and ether. The mixed solvent of a cyclic carbonate and a non-cyclic carbonate is further preferably a mixed solvent containing ethylene carbonate, dimethyl carbonate and ethyl methyl carbonate. This is because the mixed solvent containing ethylene carbonate, dimethyl carbonate and ethyl methyl carbonate has a wide operating temperature range and exhibits a persistent property even in a case where a graphite material such as natural graphite or artificial graphite is used as a negative-electrode active material.

The positive electrode typically used is a sheet-form positive electrode in which a positive electrode mixture containing a positive electrode active substance, a conductive material and a binding agent is supported on a positive electrode current collector.

The positive electrode active substance is, for example, a material which can be doped with lithium ions or dedoped. Concrete examples of such a material encompass lithium composite oxides containing at least one kind of transition metal such as V, Mn, Fe, Co, and Ni. The material is more preferably a lithium composite oxide, such as lithium nickel oxide or lithium cobalt oxide, having an $\alpha$-NaFeO$_2$ structure or a lithium composite oxide, such as lithium manganese spinel, having a spinel structure, among the above lithium composite oxides, because these lithium composite oxides have a high average discharge potential. Such a lithium composite oxide can contain any of various metal elements and further preferably a lithium-nickel composite oxide. Further, it is particularly preferable to use a lithium-nickel composite oxide containing 0.1 mol % to 20 mol % of at least one kind of metal element selected from among a group consisting of Ti, V, Cr, Mn, Fe, Co, Cu, Ag, Mg, Al, Ga, In and Sn, in ratio with respect to the sum of the number of moles of the at least one kind of metal element and the number of moles of Ni in nickel-lithium oxide. This is because such a lithium-nickel composite oxide is excellent in cycle characteristic in a high-capacity use.

Examples of the conductive material encompass carbonaceous materials such as natural graphite, artificial graphite, cokes, carbon black, pyrolytic carbons, carbon fiber, and a fired body of an organic polymer compound, and the like. The above examples of the conductive material can be used alone or in combination of two or more kinds, for example, as a mixture of artificial graphite and carbon black.

Examples of the binding agent encompass thermoplastic resins such as polyvinylidene fluoride, a copolymer of vinylidene fluoride, polytetrafluoroethylene, a tetrafluoroethylene-hexafluoropropylen copolymer, a tetrafluoroethylene-perfluoroalkylvinyl ether copolymer, an ethylene-tetrafluoroethylene copolymer, a vinylidene fluoride-hexafluoropropylene-tetrafluoroethylene copolymer, thermoplastic polyimide, polyethylene, and polypropylene. Note that the binding agent has a function as a thickening agent.

Examples of the method for obtaining the positive electrode mixture encompass a method in which a positive electrode mixture is obtained by pressing, by pressure, a positive-electrode active substance, a conductive material, and a binding agent onto a positive electrode current collector; a method in which a positive electrode mixture is obtained by preparing a paste of a positive-electrode active substance, a conductive material, and a binding agent with the use of an appropriate organic solvent; and the like.

Examples of the positive electrode current collector encompass electric conductors such as Al, Ni, and stainless steel. It is more preferable to employ Al because Al can be easily formed into a thin film and is inexpensive.

Examples of a method for producing the sheet-form positive electrode, i.e., a method for causing the positive electrode current collector to support the positive electrode mixture encompass a method in which a positive-electrode active substance, a conductive material, and a binding agent which constitute a positive electrode mixture are formed by pressure on a positive electrode current collector; a method in which (i) a positive electrode mixture is obtained from a paste of a positive-electrode active substance, a conductive material, and a binding agent which paste has been obtained by the use of an appropriate organic solvent, then (ii) the positive electrode mixture is applied to a positive electrode current collector, then (iii) a sheet-form positive electrode mixture obtained by drying is pressed by pressure so as to be firmly fixed to the positive electrode current collector; and the like.

The negative electrode typically used is a sheet-form negative electrode in which a negative electrode mixture containing a negative-electrode active substance is supported on a negative electrode current collector.

The negative-electrode active substance is, for example, a material which can be doped with lithium ions or dedoped, lithium metal, or a lithium alloy. Concrete examples of such a material encompass carbonaceous materials such as natural graphite, artificial graphite, cokes, carbon black, pyrolytic carbons, carbon fiber, and a fired body of an organic polymer compound; chalcogen compounds such as an oxide and a sulfide which can be doped with lithium ions or dedoped at an electric potential lower than that of the positive electrode; and the like. Among the above negative-electrode active substances, it is more preferable to employ a carbonaceous material which contains a graphite material such as natural graphite or artificial graphite as a main component, because great energy density can be obtained, due to superior potential flatness and low average discharge potential, in a case where the carbonaceous material is combined with the positive electrode.

Examples of a method for obtaining the negative electrode mixture encompass a method in which a negative electrode mixture is obtained by pressing a negative-electrode active substance onto a negative electrode current collector by pressure; a method in which a negative electrode mixture is obtained by preparing a paste of a negative-electrode active substance with the use of an appropriate organic solvent; and the like.

Examples of the negative electrode current collector encompass Cu, Ni, stainless steel, and the like. In particular, it is more preferable to employ Cu because Cu hardly forms an alloy with lithium in the lithium-ion secondary battery and Cu can be easily formed into a thin film.

Examples of a method for producing the sheet-form negative electrode, i.e., a method for causing the negative electrode current collector to support the negative electrode mixture encompass a method in which a negative-electrode active substance which constitutes a negative electrode mixture is formed by pressure on a negative electrode current collector; a method in which (i) a negative electrode mixture is obtained from a paste of a negative-electrode active substance which paste has been obtained by the use of an appropriate organic solvent, then (ii) the negative electrode mixture is applied to a negative electrode current collector, and then (iii) a sheet-form negative electrode mixture obtained by drying is pressed by pressure so as to be firmly fixed to the negative electrode current collector; and the like.

The non-aqueous electrolyte secondary battery of the present invention can be produced by (i) forming a member for a non-aqueous electrolyte secondary battery by arranging the positive electrode, the porous layer or the separator, and the negative electrode in this order, then (ii) putting the member for the non-aqueous electrolyte secondary battery into a container that is a housing of the non-aqueous electrolyte secondary battery, then (iii) filling the container with a non-aqueous electrolyte, and then (iv) sealing the container while reducing pressure. A shape of the non-aqueous electrolyte secondary battery is not limited to a particular one. The shape of the non-aqueous electrolyte secondary battery can be any of shapes such as a thin plate (paper) shape, a disc-like shape, a cylindrical shape, and a prismatic shape such as a rectangular parallelepiped. Note that a method for producing the non-aqueous electrolyte secondary battery is not limited to a particular one and a conventionally known production method can be employed.

The non-aqueous electrolyte secondary battery of the present invention includes the porous layer whose degree of variability in voidage is 16.0% or lower or the separator in which the porous layer is laminated on one surface or each of both surfaces of the porous film whose main component is polyolefin. Therefore, the non-aqueous electrolyte secondary battery of the present invention can substantially retain an initial discharge capacity even after a charge-discharge cycle is repeated and has an excellent cycle characteristic.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

EXAMPLES

The present invention will be described further in detail with reference to Examples and Comparative Examples. Note, however, that the present invention is not limited to these Examples.

In Examples and Comparative Examples, physical properties and the like of a laminated porous film (laminated body (separator)), a layer A (porous film), and a layer B (porous layer) were measured by the following methods.

(1) Film Thickness (unit: μm):

A film thickness of the laminated porous film (i.e., an entire film thickness), a film thickness of the layer A, and a film thickness of the layer B were measured with the use of a high-accuracy digital length measuring machine (manufactured by Mitutoyo Corporation).

(2) Weight Per Unit Area (Unit: g/m$^2$):

From the laminated porous film, a sample was cut out which had a square shape whose length of each side was 8 cm. Then, a weight W (g) of the sample as measured. Further, a weight per unit area of the laminated porous film (i.e., an entire weight per unit area) was calculated based on the following formula:

Weight per unit area (g/m$^2$)=$W$/(0.08×0.08)

Similarly, a weight per unit area of the layer A was calculated. A weight per unit area of the layer B was calculated by subtracting the weight per unit area of the layer A from the entire weight per unit area.

(3) Air Permeability (Unit: Sec/100 mL):

Air permeability of the laminated porous film was measured in conformity to JIS P8117 with the use of a digital timer Gurley densometer (manufactured by TOYO SEIKI SEISAKU-SHO, LTD).

(4) Average Particle Diameter, Particle Size Distribution (D10, D50, D90 (Based on Volume)) (Unit: μm):

A particle diameter of the filler was measured with the use of MICROTRAC (MODEL: MT-3300EXII) (manufactured by NIKKISO CO., LTD.)

(5) Degree of Variability in Voidage (Unit: %):

A degree of variability in voidage of the laminated porous film was measured by the foregoing method.

Example 1

A laminated porous film (laminated body (separator)) was prepared by the use of a layer A (porous film) and a layer B (porous layer) below.

<Layer A>

A porous film which was a base material was prepared with the use of polyethylene which was polyolefin.

That is, 70 parts by weight of ultrahigh molecular weight polyethylene powder (340M, manufactured by Mitsui Chemicals, Inc.) was mixed with 30 parts by weight of polyethylene wax (FNP-0115, manufactured by NIPPON SEIRO CO., LTD.) having a weight-average molecular weight of 1000, and thus mixed polyethylene was obtained. Then, 0.4 part by weight of an antioxidant (Irg 1010, manufactured by Ciba Specialty Chemicals), 0.1 part by weight of an antioxidant (P168, manufactured by Ciba Specialty Chemicals), and 1.3 parts by weight of sodium stearate were added to 100 parts by weight of the obtained mixed polyethylene, and further calcium carbonate (manufactured by MARUO CALCIUM CO., LTD.) having an average particle diameter of 0.1 μm was added so that the calcium carbonate accounts for 38 volume % of the total volume. The composition in the powder form was mixed by a Henschel mixer, then melt and kneaded by a biaxial kneader, and thus a polyethylene resin composition was obtained. Next, the polyethylene resin composition was stretched by a pair of rollers having a surface temperature of 150° C., and thus a sheet was prepared. The sheet was soaked in a hydrochloric acid solution (in which 4 mol/L of hydrochloric acid was mixed with 0.5% by weight of nonionic surfactant) so that calcium carbonate was dissolved and removed. Subsequently, the sheet was stretched at 105° C. to become larger by 6 times, and thus a porous film (layer A) made of polyethylene was prepared.

<Layer B>

As a binder resin, sodium carboxymethyl cellulose (CMC) (manufactured by Daicel Corporation; CMC1110) was used. As a filler, α-alumina (D10: 0.22 μm, D50: 0.44 μm, D90: 1.03 μm) was used.

The above α-alumina, CMC, and a solvent (mixed solvent of water and isopropyl alcohol) were mixed at the following ratio. That is, 3 parts by weight of CMC was mixed with 100 parts by weight of the α-alumina, and the solvent was also mixed so that, in the obtained mixed solution, a solid content concentration (alumina+CMC) was 27.7% by weight and a solvent composition contained 95% by weight of water and 5% by weight of isopropyl alcohol. Thus, an alumina dispersion was obtained. The obtained dispersion was dispersed by high pressure with the use of a high-pressure dispersing device (manufactured by SUGINO MACHINE LIMITED; Star Burst) (high-pressure dispersion condition; 100 MPa×3-pass), and thus a coating liquid 1 was prepared.

<Laminated Porous Film>

One surface of the layer A was subjected to corona treatment at 20 W/(m$^2$/min). Next, the surface of the layer A which surface had been subjected to the corona treatment was coated with the coating liquid 1 with the use of a gravure coater. In this case, tension was applied to the layer A by sandwiching a front part and a rear part of a coating location by pinch rolls so that the layer A can be uniformly coated with the coating liquid 1. Then, the coating film was dried and thus a layer B was prepared. Thus, a laminated porous film 1 in which the layer B was laminated on one surface of the layer A was obtained. Note that the layer B obtained here was a porous layer that contained a filler and a binder resin.

<Evaluation of Physical Properties>

Physical properties and the like of the laminated porous film 1 thus obtained were measured by the above described methods. Table 1 below shows measurement results.

<Preparation of Non-Aqueous Electrolyte Secondary Battery>

(Preparation of Positive Electrode)

A mixture obtained by adding 6 parts by weight of acetylene black and 4 parts by weight of polyvinylidene fluoride (manufactured by KUREHA CORPORATION) to 90 parts by weight of $LiNi_{1/3}Mn_{1/3}Co_{1/3}O_2$ which was a positive-electrode active substance and mixing these was dispersed in N-methyl-2-pyrolidone, and thus a slurry was prepared. The slurry thus obtained was uniformly applied to a part of an aluminum foil that was a positive electrode current collector and dried, and then stretched by rollers of a pressing machine so as to have a thickness of 80 µm. Next, the aluminum foil thus stretched was cut out so that (i) a part on which the positive-electrode active substance layer was formed had a size of 40 mm×35 mm and (ii) a part remained (a) which surrounded the part on which the positive-electrode active substance layer was formed, (b) which had a width of 13 mm, and (c) on which no positive-electrode active substance layer was formed. Thus, a positive electrode was obtained. Density of the positive-electrode active substance layer was 2.50 g/cm³.

(Preparation of Negative Electrode)

A slurry was prepared by adding 100 parts by weight of an aqueous solution of carboxymethyl cellulose which was a thickener and a binding agent (carboxymethyl cellulose concentration; 1% by weight) and 1 part by weight of a water-based emulsion of styrene-butadiene rubber to 98 parts by weight of graphite powder that was a negative-electrode active substance and mixing these. The slurry thus obtained was uniformly applied to a part of a stretched copper foil that was a negative electrode current collector and had a thickness of 20 µm, and the slurry was dried, and then the dried copper foil was stretched by rollers of a pressing machine so as to have a thickness of 80 µm. Next, the stretched copper foil was cut out so that (i) a part on which the negative-electrode active substance layer was formed had a size of 50 mm×40 mm and (ii) a part remained (a) which surrounded the part on which the negative-electrode active substance layer was formed, (b) which had a width of 13 mm, and (c) on which no negative-electrode active substance layer was formed. Thus, a negative electrode was obtained. Density of the negative-electrode active substance layer was 1.40 g/cm³.

(Preparation of Non-Aqueous Electrolyte Secondary Battery)

A member for a non-aqueous electrolyte secondary battery was obtained by laminating (arranging), in a lamination pouch, the positive electrode, the laminated porous film 1, and the negative electrode in this order so that (i) the layer B of the laminated porous film 1 makes contact with the positive-electrode active substance layer of the positive electrode and (ii) the layer A of the laminated porous film 1 makes contact with the negative-electrode active substance layer of the negative electrode. In this case, the positive electrode and the negative electrode were arranged such that an entire main surface of the positive-electrode active substance layer of the positive electrode is included in (overlaps with) a range of a main surface of the negative-electrode active substance layer of the negative electrode.

Then, the member for the non-aqueous electrolyte secondary battery was put into a bag formed by laminating an aluminum layer and a heat sealing layer, and further 0.25 mL of a non-aqueous electrolyte was put into the bag. The non-aqueous electrolyte was prepared by dissolving 1 mol/L of $LiPF_6$ in a mixed solvent in which ethylene carbonate, ethyl methyl carbonate, and diethyl carbonate were mixed at 3:5:2 (volume ratio). Then, a non-aqueous electrolyte secondary battery was prepared by heat sealing the bag while reducing pressure in the bag.

<Cycle Test>

With respect to a new non-aqueous electrolyte secondary battery which had not been subjected to a charge-discharge cycle, four cycles of initial charging-discharging were carried out at 25° C. In each of the four cycles, a voltage range was 4.1 V to 2.7 V, and an electric current was 0.2 C. Here, 1 C is an electric current at which rated capacity (i.e., discharge capacity at one hour rate) is discharged in one hour. The same applies to the descriptions below.

Then, 100 cycles of charge and discharge were carried out at 25° C. Each of the 100 cycles was a cycle of charge and discharge at a constant current of 1.0 C in a voltage range from 4.2 V to 2.7 V. A discharge capacity retaining ratio after the 100 cycles was calculated based on the following formula:

Discharge capacity retaining ratio (%)=(discharge capacity at 100th cycle/discharge capacity at first cycle after initial charging-discharging)× 100

The calculation results are shown in Table 2.

Example 2

A laminated porous film 2 was prepared with the use of a layer A and a layer B below.

<Layer A>

In a manner similar to that of Example 1, a porous film (layer A) made of polyethylene was prepared.

<Layer B>

A coating liquid 2 was prepared by carrying out operation similar to that of Example 1, except that α-alumina (D10: 0.26 µm, D50: 0.66 µm, D90: 1.53 µm) was used as a filler.

<Laminated Porous Film>

A laminated porous film 2 in which the layer B was laminated on one surface of the layer A was obtained by carrying out operation similar to that of Example 1, except that the coating liquid 2 was used. Note that the layer B obtained here was a porous layer containing a filler and a binder resin.

<Evaluation of Physical Properties>

Physical properties and the like of the laminated porous film 2 thus obtained were measured by the above described methods. The results are shown in Table 1 below.

<Preparation of Non-Aqueous Electrolyte Secondary Battery>

A non-aqueous electrolyte secondary battery was prepared by carrying out operation similar to that of Example 1, except that the laminated porous film 2 was used.

<Cycle Test>

A discharge capacity retaining ratio after 100 cycles of the non-aqueous electrolyte secondary battery was calculated by carrying out operation similar to that of Example 1. The results are shown in Table 2.

Example 3

A laminated porous film 3 and a non-aqueous electrolyte secondary battery including the laminated porous film 3 were prepared in a manner similar to that of Example 1, except that a porous layer (layer B) and a method for preparing a laminated porous film were changed as follows. Moreover, physical properties of the laminated porous film and the non-aqueous electrolyte secondary battery were measured and a discharge capacity retaining ratio after 100 cycles was calculated by the above described methods, as with Example 1. The results are shown in Tables 1 and 2.

<Layer B>

PVDF-based resin (manufactured by ARKEMA K.K.; product name "KYNAR2801") was dissolved in N-methyl-2-pyrolidone (hereinafter, sometimes also referred to as "NMP") by stirring under conditions of 65° C. and 30 minutes so that a solid content became 7 mass %, and a coating liquid 3 was thus prepared.

<Laminated Porous Film>

One surface of the layer A (thickness: 17 μm, voidage: 36%) was coated with the coating liquid 3 by the use of a gravure coater, and thus a coating film of the coating liquid 3 was formed on the layer A. In this case, tension was applied to the layer A by sandwiching a front part and a rear part of a coating location by pinch rolls so that the layer A can be uniformly coated with the coating liquid 3. A laminated body in which the coating film of the coating liquid 3 was provided on the layer A was soaked in 2-propanol for 5 minutes in a state in which the coating film was containing NMP. Subsequently, the laminated body was further soaked in another 2-propanol for 5 minutes, and then dried at 65° C. for 5 minutes. Thus, a laminated porous film 3 was obtained. Note that the layer B obtained here was a resin layer containing a fibrillar resin.

<Evaluation of Physical Properties>

Physical properties and the like of the laminated porous film 3 thus obtained were measured by the above described methods. The results are shown in Table 1 below.

<Preparation of Non-Aqueous Electrolyte Secondary Battery>

A non-aqueous electrolyte secondary battery was prepared by carrying out operation similar to that of Example 1, except that the laminated porous film 3 was used.

<Cycle Test>

A discharge capacity retaining ratio after 100 cycles of the non-aqueous electrolyte secondary battery was calculated by carrying out operation similar to that of Example 1. The results are shown in Table 2.

Example 4

A laminated porous film 4 was prepared by the use of a layer A and a layer B below.

<Layer A>

In a manner similar to that of Example 1, a porous film (layer A) made of polyethylene was prepared.

<Layer B>

A coating liquid 4 was prepared by carrying out operation similar to that of Example 1, except that α-alumina (D10: 0.39 μm, D50: 0.77 μm, D90: 2.73 μm) was used as a filler.

<Laminated Porous Film>

A laminated porous film 4 in which the layer B was laminated on one surface of the layer A was obtained by carrying out operation similar to that of Example 1, except that the coating liquid 4 was used. Note that the layer B obtained here was a porous layer containing a filler and a binder resin.

<Evaluation of Physical Properties>

Physical properties and the like of the laminated porous film 4 thus obtained were measured by the above described methods. The measurement results are shown in Table 1 below.

<Preparation of Non-Aqueous Electrolyte Secondary Battery>

A non-aqueous electrolyte secondary battery was prepared by carrying out operation similar to that of Example 1, except that the laminated porous film 4 was used.

<Cycle Test>

A discharge capacity retaining ratio after 100 cycles of the non-aqueous electrolyte secondary battery was calculated by carrying out operation similar to that of Example 1. The calculation results are shown in Table 2 below.

Example 5

A laminated porous film 5 and a non-aqueous electrolyte secondary battery including the laminated porous film 5 were prepared in a manner similar to that of Example 1, except that a porous layer (layer B) and a method for preparing a laminated porous film were changed as follows. Moreover, physical properties of the laminated porous film and the non-aqueous electrolyte secondary battery were measured and a discharge capacity retaining ratio after 100 cycles was calculated by the above described methods, as with Example 1. The results are shown in Tables 1 and 2.

<Layer B>

A coating liquid 5 was prepared by carrying out operation similar to that of Example 1, except that hydroxyapatite (D10: 2.24 μm, D50: 9.16 μm, D90: 21.8 μm) was used as a filler.

<Laminated Porous Film>

A laminated porous film 5 in which the layer B was laminated on one surface of the layer A was obtained by carrying out operation similar to that of Example 1, except that the coating liquid 5 was used and a front part and a rear part of a coating location were not sandwiched by pinch rolls. Note that the layer B obtained here was a porous layer containing a filler and a binder resin.
m Example 6

A laminated porous film 6 and a non-aqueous electrolyte secondary battery including the laminated porous film 6 were prepared in a manner similar to that of Example 1, except that a porous layer (layer B) and a method for preparing a laminated porous film were changed as follows. Moreover, physical properties of the laminated porous film and the non-aqueous electrolyte secondary battery were measured and a discharge capacity retaining ratio after 100 cycles was calculated by the above described methods, as with Example 1. The results are shown in Tables 1 and 2.

<Layer B>

As a coating liquid 6, a water-based emulsion of polyolefin-based resin (manufactured by Mitsui Chemicals, Inc.; product name "CHEMIPEARL S") was used in which a solid content concentration of the polyolefin-based resin was 40 mass %.

<Laminated Porous Film>

A laminated porous film 6 in which the layer B was laminated on one surface of the layer A was obtained by carrying out operation similar to that of Example 1, except that the coating liquid 6 was used. Note that the layer B obtained here was a resin layer containing a granular resin.

Comparative Example 1

A laminated porous film 7 and a non-aqueous electrolyte secondary battery including the laminated porous film 7 were prepared in a manner similar to that of Example 1, except that a porous layer (layer B) and a method for preparing a laminated porous film were changed as follows. Moreover, physical properties of the laminated porous film and the non-aqueous electrolyte secondary battery were measured and a discharge capacity retaining ratio after 100 cycles was calculated by the above described methods, as with Example 1. The results are shown in Tables 1 and 2.

<Layer B>

PVDF-based resin (manufactured by ARKEMA K.K.; product name "KYNAR2801") was added to and stirred in N-methyl-2-pyrolidone (hereinafter, also referred to as "NMP") under conditions of 65° C. and 30 minutes so that the PVDF-based resin was dissolved at a solid content of 7 mass %. Thus, a coating liquid 7 was prepared.

<Laminated Porous Film>

A laminated porous film 7 (for comparison) in which the layer B was laminated on one surface of the layer A was obtained by carrying out operation similar to that of Example 1, except that the coating liquid 7 was used and a front part and a rear part of a coating location were not sandwiched by pinch rolls. Note that the layer B obtained here was a resin layer containing a fibrillar resin.

TABLE 2

| | Discharge capacity retaining ratio after 100 cylces (%) |
|---|---|
| Example 1 | 84 |
| Example 2 | 84 |
| Example 3 | 82 |
| Example 4 | 67 |
| Example 5 | 65 |
| Example 6 | 75 |
| Comparative Example 1 | 61 |

From the descriptions of Tables 1 and 2, it was found that the non-aqueous electrolyte secondary batteries including the laminated bodies (separator) obtained by laminating the porous layers of Examples 1 through 3 in which the degree of variability in voidage inside the layer B was 7.0% or lower had discharge capacity retaining ratios of 84% (Examples 1 and 2) and 82% (Example 3), and thus substantially retained the initial discharge capacity even after repeating the charge-discharge cycle. The non-aqueous electrolyte secondary batteries including the laminated bodies (separator) obtained by laminating the porous layers of Examples 4 through 6 in which the degree of variability in voidage inside the layer B was higher than 7.0% and 16.0% or lower had discharge capacity retaining ratios of 67% (Example 4), 65% (Example 5), and 75% (Example 6). These are inferior to those of Examples 1 through 3 in which the degree of variability in voidage inside the layer B was 7.0% or lower but the initial discharge capacity was found to be retained even after repeating the charge-discharge cycle. On the other hand, the non-aqueous electrolyte secondary battery including the laminated body (separator) obtained by laminating the porous layer of Comparative Example 1 in which the degree of variability in voidage inside the layer B was higher than 16.0% had the decreased discharge capacity retaining ratio, i.e., 61%.

[Conclusion]

From the results above, it was found that the porous layer whose degree of variability in voidage therein is at most

TABLE 1

| | Total film thickness ($\mu$m) | Film thickness of layer A ($\mu$m) | Film thickness of layer B ($\mu$m) | Total W.P.U.A. (g/m$^2$) | W.P.U.A. of layer A (g/m$^2$) | W.P.U.A. of layer B (g/m$^2$) |
|---|---|---|---|---|---|---|
| Example 1 | 20.8 | 17.3 | 3.5 | 14.5 | 7.2 | 7.3 |
| Example 2 | 21.6 | 17.1 | 4.5 | 14.9 | 7.1 | 7.8 |
| Example 3 | 19.4 | 17.0 | 2.4 | 8.4 | 6.8 | 1.6 |
| Example 4 | 18.6 | 15.3 | 3.3 | 13.3 | 6.7 | 6.6 |
| Example 5 | 23.0 | 16.1 | 6.9 | 14.9 | 7.2 | 7.7 |
| Example 6 | 20.1 | 17.0 | 2.6 | 10.5 | 6.8 | 3.5 |
| Comparative Example 1 | 20.3 | 17.0 | 3.3 | 17.6 | 6.8 | 10.8 |

| | Air permeability (sec/100 ml) | D10 ($\mu$m) | D50 ($\mu$m) | D90 ($\mu$m) | Degree of variability in voldage in layer B (%) |
|---|---|---|---|---|---|
| Example 1 | 115 | 0.22 | 0.44 | 1.09 | 3.1 |
| Example 2 | 112 | 0.26 | 0.66 | 1.53 | 3.8 |
| Example 3 | 410 | — | — | — | 4.1 |
| Example 4 | 142 | 0.39 | 0.77 | 2.73 | 7.4 |
| Example 5 | 152 | 2.24 | 9.16 | 21.8 | 10.5 |
| Example 6 | 481 | — | — | — | 15.3 |
| Comparative Example 1 | 674 | — | — | — | 17.4 |

W.P.U.A.: Weight per unit area 16.0% can be suitably used as a member for a non-aqueous electrolyte secondary battery having an excellent cycle characteristic.

INDUSTRIAL APPLICABILITY

The porous layer of the present invention and the separator formed by laminating the porous layer can be used widely in the field of producing a non-aqueous electrolyte secondary battery.

REFERENCE SIGNS LIST

10: Base material
11: Coating liquid
15: Wind-off device
16 and 17: Guide roll
18: Gravure roll
20: Pressing roller

The invention claimed is:

1. A porous layer for a non-aqueous electrolyte secondary battery separator, wherein:
when said porous layer is divided into 32 rectangular parallelepiped sections whose longitudinal length is 2.3 μm, transverse length is 2.3 μm, and thickness is identical with that of said porous layer, a degree of variability in voidage that is measured in the 32 sections is 16.0% or lower,
wherein the degree is obtained by dividing a standard deviation of the voidages by an average of voidages obtained in the 32 sections;
said porous layer contains (i) a resin which is one or more resins selected from the group consisting of polyolefins, fluorine-containing resins, fluorine-containing rubbers, aromatic polyamides, wholly aromatic polyamides, rubbers, resins whose melting point or glass transition temperature is 180° C. or higher, and water-soluble polymers and (ii) a filler;
a content of the filler is 60 mass % or higher and 99 mass % or lower relative to said porous layer containing the resin and the filler; and
the filler is a filler in which, in terms of average particle diameter obtained based on a volume, (i) D10 is 0.005 μm to 0.4 μm, D50 is 0.01 μm to 1.0 μm, and D90 is 0.5 μm to 5.0 μm and (ii) a difference between D10 and D90 is 2 μm or less.

2. A porous layer for a non-aqueous electrolyte secondary battery separator, wherein:
when said porous layer is divided into 32 rectangular parallelepiped sections whose longitudinal length is 2.3 μm, transverse length is 2.3 μm, and thickness is identical with that of said porous layer, a degree of variability in voidage that is measured in the 32 sections is 16.0% or lower wherein the degree is obtained by dividing a standard deviation of the voidages by an average of voidages obtained in the 32 sections;
said porous layer contains a resin which is one or more resins selected from the group consisting of polyolefins and fluorine-containing resins; and
said porous layer does not contain a filler.

3. The porous layer as set forth in claim 1, wherein the degree of variability in voidage that is measured in the 32 sections is 7.0% or lower.

4. The porous layer as set forth in claim 2 wherein:
the degree of variability in viodage that is measured in the 32 section is 70% or lower.

5. The porous layer as set forth in claim 2, wherein:
said porous layer is a resin layer containing a fibrillar resin or a granular resin.

6. A non-aqueous electrolyte secondary battery laminated separator which is formed by laminating a porous layer for a non-aqueous electrolyte secondary battery separator recited in claim 1 on one surface or each of both surfaces of a porous film which contains polyolefin as a main component.

7. A non-aqueous electrolyte secondary battery laminated separator which is formed by laminating a porous layer for a non-aqueous electrolyte secondary battery separator recited in claim 2 on one surface or each of both surfaces of a porous film which contains polyolefin as a main component.

8. A member for a non-aqueous electrolyte secondary battery, said member comprising:
a positive electrode;
a non-aqueous electrolyte secondary battery laminated separator recited in claim 6; and
a negative electrode, the positive electrode, the non-aqueous electrolyte secondary battery laminated separator, and the negative electrode being arranged in this order.

9. A member for a non-aqueous electrolyte secondary battery, said member comprising:
a positive electrode;
a non-aqueous electrolyte secondary battery laminated separator recited in claim 7; and
a negative electrode,
the positive electrode, the non-aqueous electrolyte secondary battery laminated separator, and the negative electrode being arranged in this order.

10. A non-aqueous electrolyte secondary battery comprising:
a porous layer for a non-aqueous electrolyte secondary battery separator recited in claim 1.

11. A non-aqueous electrolyte secondary battery comprising:
a porous layer for a non-aqueous electrolyte secondary battery separator recited in claim 2.

12. A non-aqueous electrolyte secondary battery comprising:
a non-aqueous electrolyte secondary battery laminated separator recited in claim 6.

13. A non-aqueous electrolyte secondary battery comprising:
a non-aqueous electrolyte secondary battery laminated separator recited in claim 7.

* * * * *